United States Patent
Lettau et al.

(10) Patent No.: US 6,314,913 B1
(45) Date of Patent: Nov. 13, 2001

(54) REELABLE CAT TOY

(76) Inventors: Tom Lettau, P.O. Box 664; Steven C. Bales, 415 Woodside Dr., both of Pine, CO (US) 80470

(*) Notice: Subject to any disclaimer, the term of this patent is extended or adjusted under 35 U.S.C. 154(b) by 0 days.

(21) Appl. No.: 09/540,497

(22) Filed: Mar. 31, 2000

(51) Int. Cl.⁷ .................................................. A01K 29/00
(52) U.S. Cl. ........................... 119/707; 119/702; 119/708
(58) Field of Search ........................... 119/702, 707, 119/708, 711; 43/44.96, 44.97, 44.94, 43.12; D30/160; 242/223

(56) References Cited

U.S. PATENT DOCUMENTS

| | | |
|---|---|---|
| D. 295,798 | 5/1988 | Boelk . |
| 1,699,308 | 1/1929 | Postings . |
| 2,246,965 * | 6/1941 | Yoder ................................. 119/707 |
| 2,307,905 | 1/1943 | Ament . |
| 3,089,663 * | 5/1963 | Kirby, Sr. ........................... 43/18.1 |
| 3,731,925 * | 5/1973 | Caldwell .............................. 273/26 |
| 4,499,855 | 2/1985 | Galkiewicz . |
| 4,541,197 * | 9/1985 | LeRoue ............................... 43/18.1 |
| 4,940,018 | 7/1990 | Edling . |
| 5,467,740 | 11/1995 | Redwine . |
| 5,743,215 * | 4/1998 | Zeff ................................... 119/708 |

FOREIGN PATENT DOCUMENTS

4173035 * 6/1992 (JP) .

* cited by examiner

Primary Examiner—Charles T. Jordan
Assistant Examiner—Judith A. Nelson

(57) ABSTRACT

A reelable cat toy for entertaining a cat. The reelable cat toy includes a rod measuring approximately 2½ feet long and having a first handle member at one end thereof and also having a plurality of eyelets spaced along and securely attached to the pole, and also includes a reel member having a housing which includes a first compartment and a second compartment being separated by a first end wall with the first compartment having an open end which is closeable with a cap member, the first compartment being adapted to store lures therein, the reel member further having a spool member journaled inside the second compartment, a spool release member engageable with the spool member, and a second handle member which is connected to the spool member, and further includes a plurality of lures storable in the first compartment and resembling a mouse, a spider, an edible worm, and a feather duster.

16 Claims, 3 Drawing Sheets

REELABLE CAT TOY

BACKGROUND OF THE INVENTION

1. Field of the Invention

The present invention relates to a plaything for a cat and more particularly pertains to a new reelable cat toy for entertaining a cat.

2. Description of the Prior Art

The use of plaything for a cat is known in the prior art. More specifically, plaything for a cat heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,467,740; 4,499,855; 4,940,018; U.S. Pat. No. Des. 295,798; U.S. Pat. Nos. 2,307,905; and 1,699,308.

While these devices fulfill their respective, particular objectives and requirements, the aforementioned patents do not disclose a new reelable cat toy. The inventive device includes a rod measuring approximately 2½ feet long and having a first handle member at one end thereof and also having a plurality of eyelets spaced along and securely attached to the pole, and also includes a reel member having a housing which includes a first compartment and a second compartment being separated by a first end wall with the first compartment having an open end which is closeable with a cap member, the first compartment being adapted to store lures therein, the reel member further having a spool member journaled inside the second compartment, a spool release member engageable with the spool, and a second handle member which is connected to the spool member, and further includes a plurality of lures storable in the first compartment and resembling a mouse, a spider, an edible worm, and a feather duster.

In these respects, the reelable cat toy according to the present invention substantially departs from the conventional concepts and designs of the prior art, and in so doing provides an apparatus primarily developed for the purpose of entertaining a cat.

SUMMARY OF THE INVENTION

In view of the foregoing disadvantages inherent in the known types of plaything for a cat now present in the prior art, the present invention provides a new reelable cat toy construction wherein the same can be utilized for entertaining a cat.

The general purpose of the present invention, which will be described subsequently in greater detail, is to provide a new reelable cat toy which has many of the advantages of the plaything for a cat mentioned heretofore and many novel features that result in a new reelable cat toy which is not anticipated, rendered obvious, suggested, or even implied by any of the prior art plaything for a cat, either alone or in any combination thereof.

To attain this, the present invention generally comprises a rod measuring approximately 2½ feet long and having a first handle member at one end thereof and also having a plurality of eyelets spaced along and securely attached to the pole, and also includes a reel member having a housing which includes a first compartment and a second compartment being separated by a first end wall with the first compartment having an open end which is closeable with a cap member, the first compartment being adapted to store lures therein, the reel member further having a spool member journaled inside the second compartment, a spool release member engageable with the spool, and a second handle member which is connected to the spool member, and further includes a plurality of lures storable in the first compartment and resembling a mouse, a spider, an edible worm, and a feather duster.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new reelable cat toy which has many of the advantages of the plaything for a cat mentioned heretofore and many novel features that result in a new reelable cat toy which is not anticipated, rendered obvious, suggested, or even implied by any of the prior art plaything for a cat, either alone or in any combination thereof.

It is another object of the present invention to provide a new reelable cat toy which may be easily and efficiently manufactured and marketed.

It is a further object of the present invention to provide a new reelable cat toy which is of a durable and reliable construction.

An even further object of the present invention is to provide a new reelable cat toy which is susceptible of a low cost of manufacture with regard to both materials and labor, and which accordingly is then susceptible of low prices of sale to the consuming public, thereby making such reelable cat toy economically available to the buying public.

Still yet another object of the present invention is to provide a new reelable cat toy which provides in the apparatuses and methods of the prior art some of the advantages thereof, while simultaneously overcoming some of the disadvantages normally associated therewith.

Still another object of the present invention is to provide a new reelable cat toy for entertaining a cat.

Yet another object of the present invention is to provide a new reelable cat toy which includes a rod measuring approximately 2½ feet long and having a first handle member at one end thereof and also having a plurality of eyelets spaced along and securely attached to the pole, and also includes a reel member having a housing which includes a first compartment and a second compartment being separated by a first end wall with the first compartment having an open end which is closeable with a cap member, the first compartment being adapted to store lures therein, the reel member further having a spool member journaled inside the second compartment, a spool release member engageable with the spool, and a second handle member which is connected to the spool member, and further includes a plurality of lures storable in the first compartment and resembling a mouse, a spider, an edible worm, and a feather duster.

Still yet another object of the present invention is to provide a new reelable cat toy that is very safe and convenient to use indoors without the worry of breaking things.

Even still another object of the present invention is to provide a new reelable cat toy that allows the user to cast the lure and to interact with the cat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
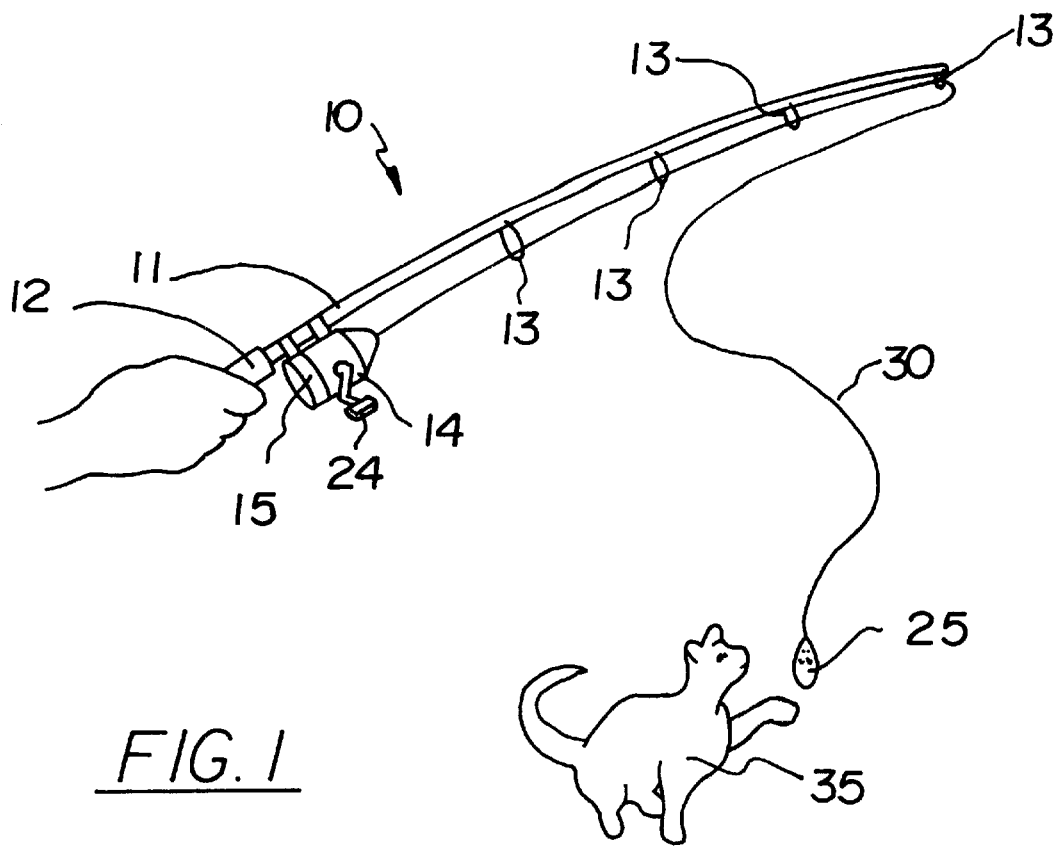
FIG. 1 is a perspective view of a new reelable cat toy in use according to the present invention.
Figure 2:
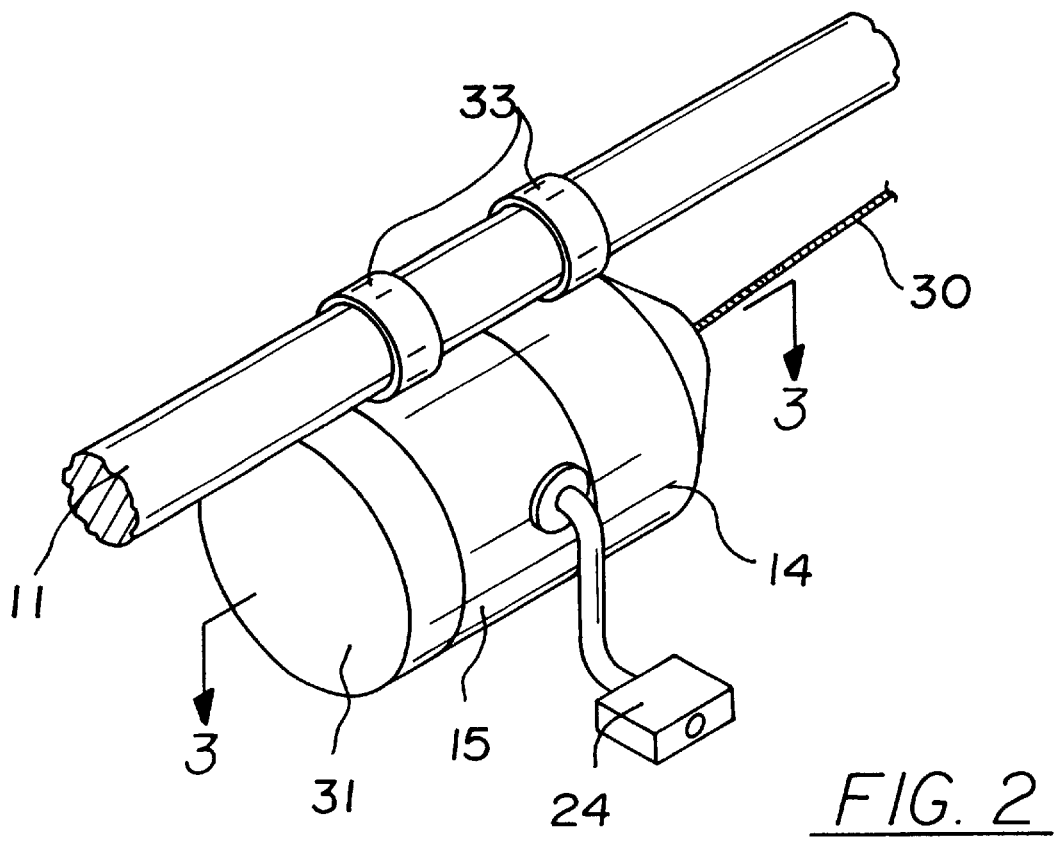
FIG. 2 is a detailed perspective view of reel member of the present invention.
Figure 3:
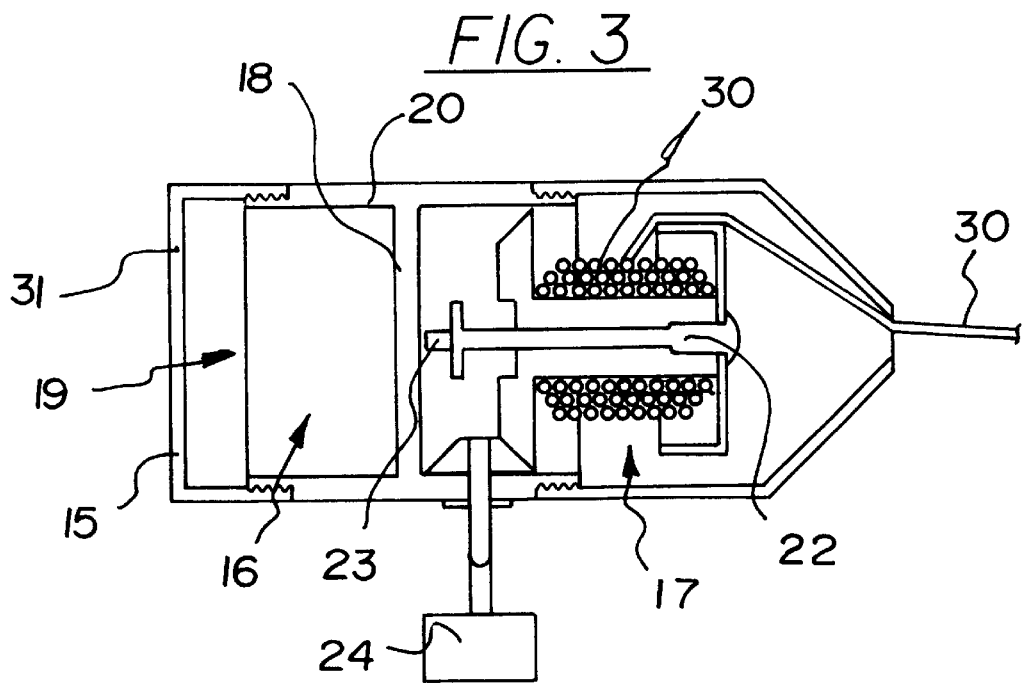
FIG. 3 is a side cross-sectional view of one type of reel member of the present invention.
Figure 4:
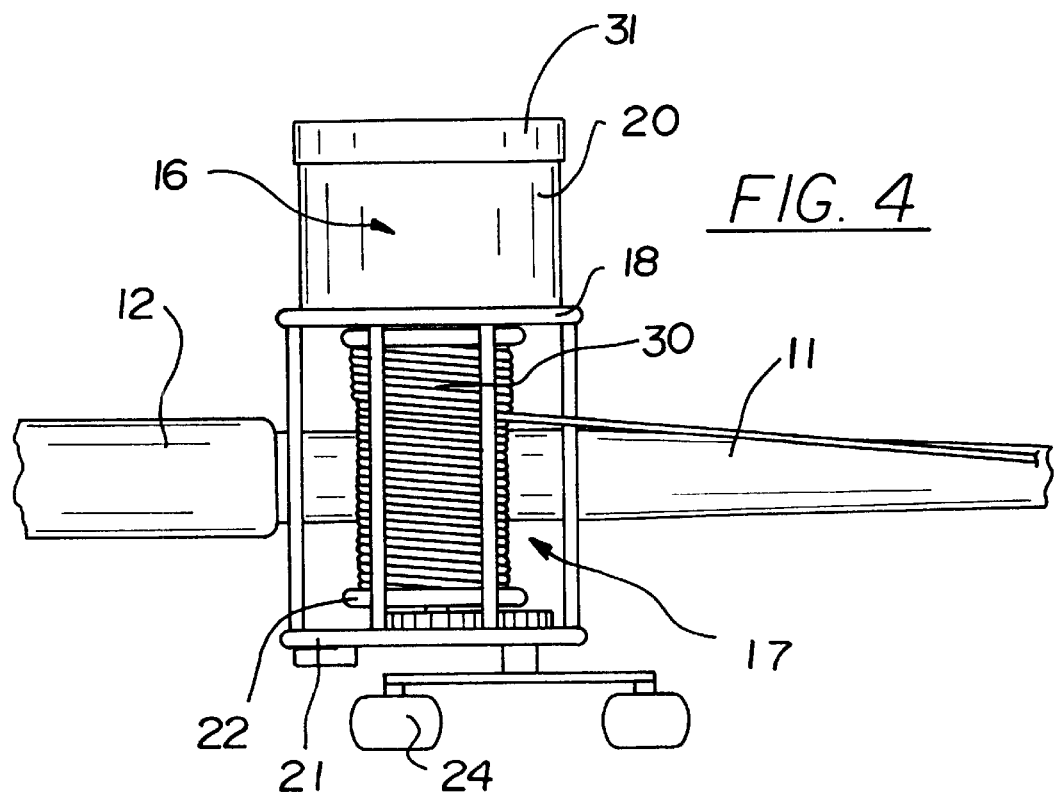
FIG. 4 is a side cross-sectional view of another type of reel member of the present invention.
Figure 5:
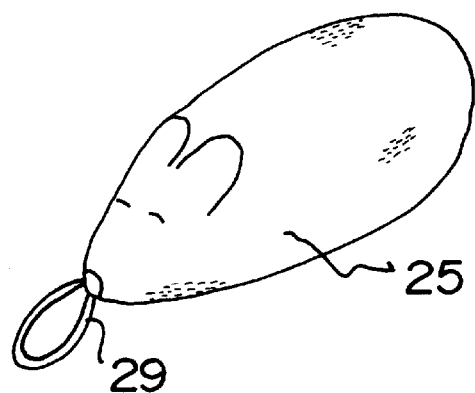
FIG. 5 is a perspective view of a mouse lure of the present invention.
Figure 6:
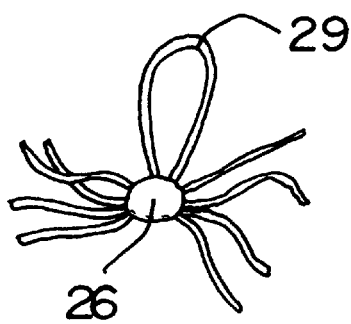
FIG. 6 is a side elevational view of a spider lure of the present invention.
Figure 7:
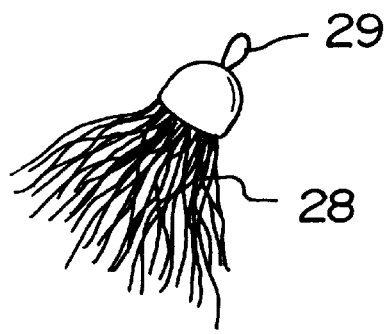
FIG. 7 is a side elevational view of a feather duster lure of the present invention.
Figure 8:
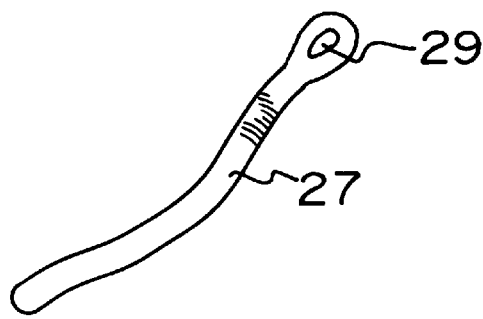
FIG. 8 is a perspective view of an edible lure worm of the present invention.

With reference now to the drawings, and in particular to FIGS. 1 through 8 thereof, a new reelable cat toy embodying the principles and concepts of the present invention and generally designated by the reference numeral 10 will be described.

As best illustrated in FIGS. 1 through 8, the reelable cat toy 10 generally comprises a rod 11 having a plurality of eyelets 13 securely attached and bolted and spaced therealong and having a first handle member 12 securely and conventionally disposed at one end thereof. A reel member 14 is removeably and securely mounted with fasteners 33 upon the rod 11 near the first handle member 12 and has a housing 15 including a first compartment 16 having an open end 19 and a second compartment 17. The housing 15 further includes a cap member 31 being closeable over the open end 19 of the first compartment 16. The reel member 14 further includes a spool member 22 being rotatably disposed inside the second compartment 17. A flexible line 30 is carried about the spool member 22 and is extended through the eyelets 13. A second handle member 24 is conventionally connected to the spool member 22; and a spool release member 23 is engageable to the spool member 22. The compartments 16,17 are separated by a first end wall 18 with the first compartment 16 having a side wall 20 and being adapted to store lures therein. The second compartment 17 includes a second end wall 21 which is spacedly opposed to the first end wall 18. The spool member 22 has ends which are journaled to the first and second end walls 16,17. The second handle member 24 is directly and conventionally connected to the spool member 22 to substantially reduce drag placed upon the spool member 22. The flexible line 30 is made of yarn which is crocheted. A plurality of lures 25–28 each of which includes an eyelet 29 connected thereto is removeably attached to the flexible line 30 with the lures 25–28 resembling a mouse 25, a spider 26, an edible worm 27, and a feather duster 28.

In use, the user attaches a selected lure to the yarn 30 and lets out the yarn 30 from the reel member 14 and suspends the lure 20-25 for the cat 35 to play with. Since the reel member 14 has very little drag, the cat 35 is able to take the lure 25–28 and let out the yarn 30 from the reel member 14 which is preferably a fly reel.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A reelable cat toy comprising:

a rod having a plurality of eyelets securely attached and spaced therealong and having a first handle member securely disposed at one end thereof;

a reel member removeably and securely mounted upon said rod near said first handle member and having a housing including a first compartment having an open end and a second compartment, said housing further including a cap member being closeable over said open end of said first compartment, said reel member further including a spool member being rotatably disposed inside said second compartment; a flexible line carried about said spool member and extended through said eyelets; a second handle member connected to said spool member; and a spool release member engageable to said spool member; and a plurality of lures each of which includes an eyelet connected thereto for attaching to said flexible line;

wherein said compartments are separated by a first end wall, said first compartment having a side wall and being adapted to store said lures therein.

2. A reelable cat toy as described in claim 1, wherein said second compartment includes a second end wall which is opposed to said first end wall.

3. A reelable cat toy as described in claim 1, wherein said spool member has ends which are journaled to said first and second end walls.

4. A reelable cat toy as described in claim 1, wherein said second handle member is directly connected to said spool member to substantially reduce drag placed upon said spool member.

5. A reelable cat toy as described in claim 1, wherein said flexible line is made of yarn which is crocheted.

6. A reelable cat toy as described in claim 1, wherein said reel member is a fly reel.

7. A reelable cat toy as described in claim 1, wherein said lures include a mouse, a spider, an edible worm, and a feather duster.

8. A reelable cat toy comprising:

a rod having a plurality of eyelets securely attached and spaced therealong and having a first handle member securely disposed at one end thereof;

a reel member removeably and securely mounted upon said rod near said first handle member and having a housing including a first compartment having an open end and a second compartment, said housing further including a cap member being closeable over said open end of said first compartment, said reel member further including a spool member being rotatably disposed inside said second compartment; a flexible line carried about said spool member and extended through said eyelets; a second handle member connected to said spool member; and a spool release member engageable to said spool member, said compartments being separated by a first end wall, said first compartment having a side wall and being adapted to store lures therein, said second compartment including a second end wall which is opposed to said first end wall, said spool member having ends which are journaled to said first and second end walls, said second handle member being directly connected to said spool member to substantially reduce drag placed upon said spool member, flexible line being made of yarn which is crocheted; said reel member being essentially a fly reel; and a plurality of lures each of which includes an eyelet connected thereto for attaching to said flexible line, said lures resembling a mouse, a spider, an edible worm, and a feather duster.

9. A reelable cat toy comprising:

a rod having a plurality of eyelets attached thereto and spaced therealong, said rod having a first handle member securely disposed at one end thereof;

a reel member removably mounted on said rod near said first handle member, said reel member having a housing including a first compartment having an open end and a second compartment, said reel member including a spool member being rotatably mounted in said second compartment;

a flexible line carried about said spool member and extended through said eyelets;

a second handle member connected to said spool member;

a spool release member engageable to said spool member; and a plurality of lures each of which includes an eyelet connected thereto for attaching to said flexible line;

wherein said compartments are separated by a first end wall, said first compartment having a side wall and being adapted to store said lures therein.

10. A reelable cat toy as described in claim 9, wherein said second compartment includes a second end wall which is opposed to said first end wall.

11. A reelable cat toy as described in claim 9, wherein said spool member has ends which are journaled to said first and second end walls.

12. A reelable cat toy as described in claim 9, wherein said second handle member is directly connected to said spool member to substantially reduce drag placed upon said spool member.

13. A reelable cat toy as described in claim 9, wherein said flexible line is made of yarn which is crocheted.

14. A reelable cat toy as described in claim 9, wherein said reel member is a fly reel.

15. A reelable cat toy as described in claim 9, wherein said lures include a mouse, a spider, an edible worm, and a feather duster.

16. A reelable cat toy as described in claim 9, wherein said housing includes a cap member being closeable over said open end of said first compartment.

* * * * *